(12) United States Patent
Nakagomi

(10) Patent No.: US 6,513,630 B1
(45) Date of Patent: Feb. 4, 2003

(54) DOUBLE-WOUND BAND BRAKING DEVICE

(75) Inventor: Hirofumi Nakagomi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/709,296

(22) Filed: Nov. 13, 2000

(30) Foreign Application Priority Data

Nov. 12, 1999 (JP) .......................................... 11-323135

(51) Int. Cl.[7] .............................................. F16D 51/00
(52) U.S. Cl. ................................. 188/77 W; 192/107 T
(58) Field of Search .......................... 188/77 R, 77 W, 188/75, 76, 26, 58; 192/80, 18 R, 107 T

(56) References Cited

U.S. PATENT DOCUMENTS

| | | | | |
|---|---|---|---|---|
| 774,448 A | * | 11/1904 | Norris ...................... | 188/77 W |
| 1,697,869 A | * | 1/1929 | Hills ...................... | 188/77 W |
| 1,875,717 A | * | 9/1932 | Forbes .................... | 188/77 W |
| 2,020,404 A | * | 11/1935 | Farkas .................... | 188/77 W |
| 2,252,247 A | * | 8/1941 | Bjorge .................... | 188/77 W |
| 2,302,521 A | * | 11/1942 | Bjorge .................... | 188/77 W |
| 3,310,136 A | * | 3/1967 | Bricker et al. ........... | 188/77 W |
| 3,907,075 A | * | 9/1975 | Christian et al. ........ | 188/77 W |
| 4,602,706 A | * | 7/1986 | Blinks et al. ............ | 192/107 T |
| 4,757,880 A | * | 7/1988 | Grzesiak .................. | 188/77 W |
| 5,012,905 A | * | 5/1991 | Tanaka .................... | 188/77 W |
| 5,083,642 A | * | 1/1992 | Stefanutti et al. ........ | 188/77 W |
| 5,476,160 A | * | 12/1995 | Fenoglio et al. .......... | 188/77 W |

FOREIGN PATENT DOCUMENTS

JP 02-076934 * 2/1990

* cited by examiner

Primary Examiner—Jack Lavinder
Assistant Examiner—Robert A. Siconolfi
(74) Attorney, Agent, or Firm—Miles & Stockbridge P.C.

(57) ABSTRACT

A double wound band which comprises an annular intermediate band, a pair of annular outer bands each with a free end secured to face the free end of the intermediate band, all three bands with a firctional surface formed on the inner peripheral surface, an anchor portion, an applied portion for receiving the force from an actuator to contract the bands to brake a rotary member. The braking device further comprises a deformation amount balancing device for balancing an amount of elastic deformation of the intermediate band and an amount of elastic deformation of the outer bands at a predetermined position, and a center misalignment correction device for correcting a center misalignment between the intermediate band and the outer bands.

6 Claims, 16 Drawing Sheets

DOUBLE-WOUND BAND BRAKING DEVICE

This application claims the benefits of Japanese Application No. 11-323135 which is hereby incorporated by reference.

BACKGROUND OF THE INVENTION

1. Field of the Invention

The present invention relates to a double-wound band braking device which is used in an automatic transmission, or the like, of a car.

2. Related Background Art

In an automatic transmission of a car or in an ordinary industrial machine, a band braking device is widely used to brake a gear element or a rotating element thereof. Generally, the band braking device applies the brake in such a manner that a friction member is attached to the inner peripheral surface of one steel plate formed in an annular shape to serve as a brake band, and this brake band is contracted by an actuator to thereby tighten up a gear element or a rotary element disposed on the inner side thereof. Recently, there is proposed a double-wound band braking device which uses a double-wound brake band in order to reduce an operational force of the actuator or to improve the braking controllability.

A double-wound brake band 3 is mainly composed of an annular intermediate band 11 and a pair of annular outer bands 15 which are welded and jointed to the free end of the intermediate band 11 through a coupling plate 13 in such a state that the free ends of the outer bands 15 respectively face the free ends of the intermediate band 11, as shown in an example of an automatic transmission of a car in FIG. 13 and FIG. 14 (a view seen from the arrow F in FIG. 13). Friction members 17 and 19 are respectively attached to the inner peripheral surfaces of the intermediate band 11 and the outer bands 15. An anchor bracket 21 which is latched by an anchor pin 5 on the side of the main body casing 1 is welded to the operational end side of the outer bands 15, while an applied bracket 25 for receiving the force in a direction in which the intermediate band 11 and the outer bands 15 are contracted from a push rod 23 of an actuator 7 is welded to the operational end side of the intermediate band 11. In this double-wound brake band 3, when the push rod 23 of the actuator 7 is operated in the direction indicated by the arrow in FIG. 13, the intermediate band 11 and the outer bands 15 are contracted, and the brake is applied on a gear element (hereinafter called "the drum") 27 which is fitted in the double-wound brake band 3.

Incidentally, in the conventional double-wound brake band 3 described above, the coefficient of elasticity of the single intermediate band 11 is naturally different from that of the paired outer bands 15. For this reason, when receiving a load from the actuator 7, the intermediate band 11 relatively moves (rotates) around a joint portion with respect to the outer bands 15 since an amount of deformation of the intermediate band 11 becomes larger than that of the outer bands 15. This relative movement is not only caused upon reception of the load at the time of braking, but caused due to an initial load at the time of setting. FIGS. 15 and 16 show a state of the double-wound brake band 3 at the time of setting in an exaggerated manner. As seen from these drawings, the operational end side portion of the intermediate band 11 is protruded inward with respect to the outer bands 15 only by the dimensions m. On the other hand, the free end side portion thereof is protruded outward with respect to the outer bands 15 only by the dimensions n. Also, since the intermediate band 11 has the high rigidity at the joint portions thereof with the outer bands 15, an amount of deformation of the operational end side portion is larger than that of the free end side portion. Thus, the dimensions m is larger than the dimensions n.

The double-wound brake band 3 has been manufactured in various dimensions depending on the use or specifications thereof. Thus, the double-wound brake band 3 of large dimensions naturally has a heavy weight. However, in order to reduce the size and the weight of the whole brake band, the plate thickness of the anchor bracket 21 or the size of the anchor pin 5 can not be made large in proportion to the weight of the double-wound brake band 3. For this reason, in the double-wound brake band 3 having large dimensions and heavy weight, the plate thickness of the anchor bracket 21 and the size of the anchor pin 5 are relatively small, so that the brake band 3 becomes unstable due to insufficient fixation when it is set in the main body casing 1. Thus, these members may be inclined with respect to the drum 27.

When the relative movement between the intermediate band 11 and the outer bands 15 or the inclination of the double-wound brake band 3 as described above is generated, there arises a possibility that friction members 17 and 19 which are attached to the inner peripheral surface of the intermediate band 11 or those of the outer bands 15 may be brought into contact with the outer peripheral surface of the drum 27. In this case, when the braking device is incorporated in an automatic transmission of a car, the friction members 17 and 19 are brought into sliding contact with the outer peripheral surface of the drum 27 all the time while the car is running except the time of braking by the double-wound band braking device, which results in various inconveniences including an increase of the cost of fuel for running and deterioration of the surfaces of the friction members 17 and 19 due to frictional heat.

SUMMARY OF THE INVENTION

Taking the above circumstances into consideration, an object of the present invention is to provide a double-wound band braking device for preventing unnecessary contact between the double-wound brake band and a rotary member simply and effectively.

In order to solve the above problems, according to a main aspect of the present invention, there is proposed a double-wound band braking device having a double-wound brake band which comprises: an annular intermediate band with a friction surface formed on the inner peripheral side thereof;

a pair of annular outer bands each with a free end secured to face the free end of the intermediate band and each with a friction surface formed on the inner peripheral side thereof;

an anchor portion formed on the operational end side of either one of the intermediate band and the outer bands and is latched on the casing side of the main body; and an applied portion formed on the operational end side of the other of the intermediate band and the outer bands, for receiving the force in a direction in which the intermediate band and the outer bands are contracted, from an actuator, and the double-wound band braking device to be used in braking a rotary member fitted in the double-wound brake band, comprising either one of:

deformation amount balancing means for balancing an amount of elastic deformation of the intermediate band and an amount of elastic deformation of the outer bands at a predetermined position; and center-misalignment correction means for correcting the center-misalignment between the intermediate band and the outer bands.

According to a second aspect of the present invention, in the double-wound band braking device of the main aspect of the invention, at least one of the displacement amount balancing means and the center-misalignment correction means may be a guide which is secured between the central portion in the circumferential direction of the intermediate band and the applied portion, for coming into contact with the outer peripheral surfaces of the outer bands in a sliding manner or a rolling manner.

According to a third aspect of the present invention, in the double-wound band braking device of the main aspect, the anchor portion may be formed on the operational end side of the intermediate band and the deformation amount balancing means may be a hook secured to the anchor portion for latching the outer bands being contracted by a predetermined amount.

According to a fourth aspect of the present invention, in the double-wound band braking device of the main aspect, the deformation amount balancing means may be an elastic member which is interposed between the operational end of the intermediate band and the free end of the intermediate band.

According to a fifth aspect of the present invention, in the double-wound band braking device of the third or fourth aspect, the center misalignment correction means may be a positioning piece which is secured to the outer peripheral surfaces of the paired outer bands in such a manner that it is approximated to or brought into sliding contact with the outer peripheral surface of the intermediate band so as to prevent a relative protrusion of the intermediate band.

According to a sixth aspect of the present invention, in the double-wound band braking device of the main aspect of the present invention, at least either one of the deformation amount balancing means and the center misalignment correction means may be a positioning piece which is secured to the outer peripheral surface of the intermediate band in such a manner that it is approximated to or brought into sliding contact with the outer peripheral surfaces of the outer bands so as to prevent a relative protrusion of the outer bands.

According to a seventh aspect of the present invention, in the double-wound band braking device of the main aspect of the present invention, at least one of the deformation amount balancing means and the center misalignment correction means may be a plurality of positioning pieces interposed between the main body casing and the double-wound brake band.

DESCRIPTION OF THE PREFERRED EMBODIMENTS

Several embodiments in which the present invention is applied to a double-wound band braking device of an automatic transmission in a car will be fully described below with reference to the attached drawings.

Figure 1:
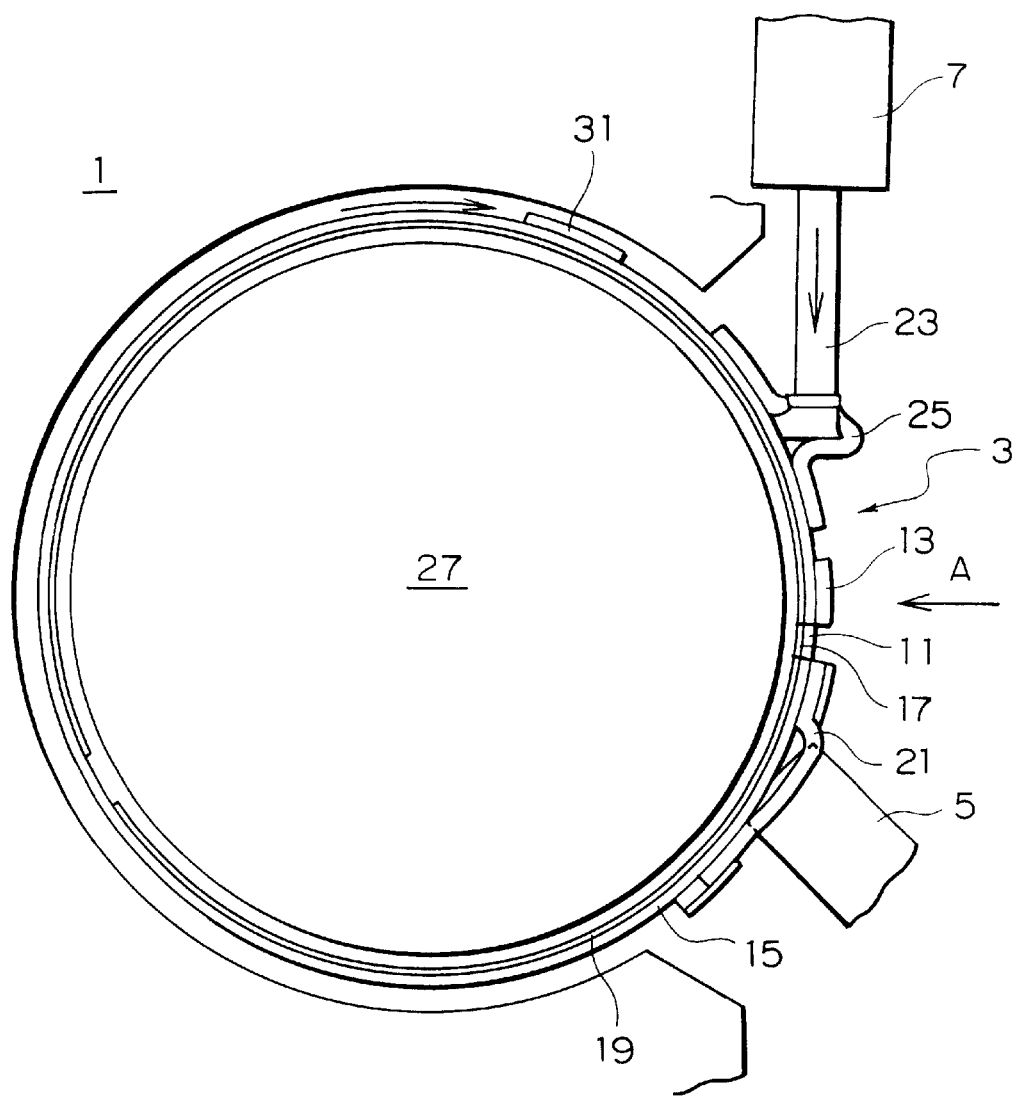
FIG. 1 is a side view for showing a double-wound band braking device according to a first embodiment of the present invention.
Figure 2:
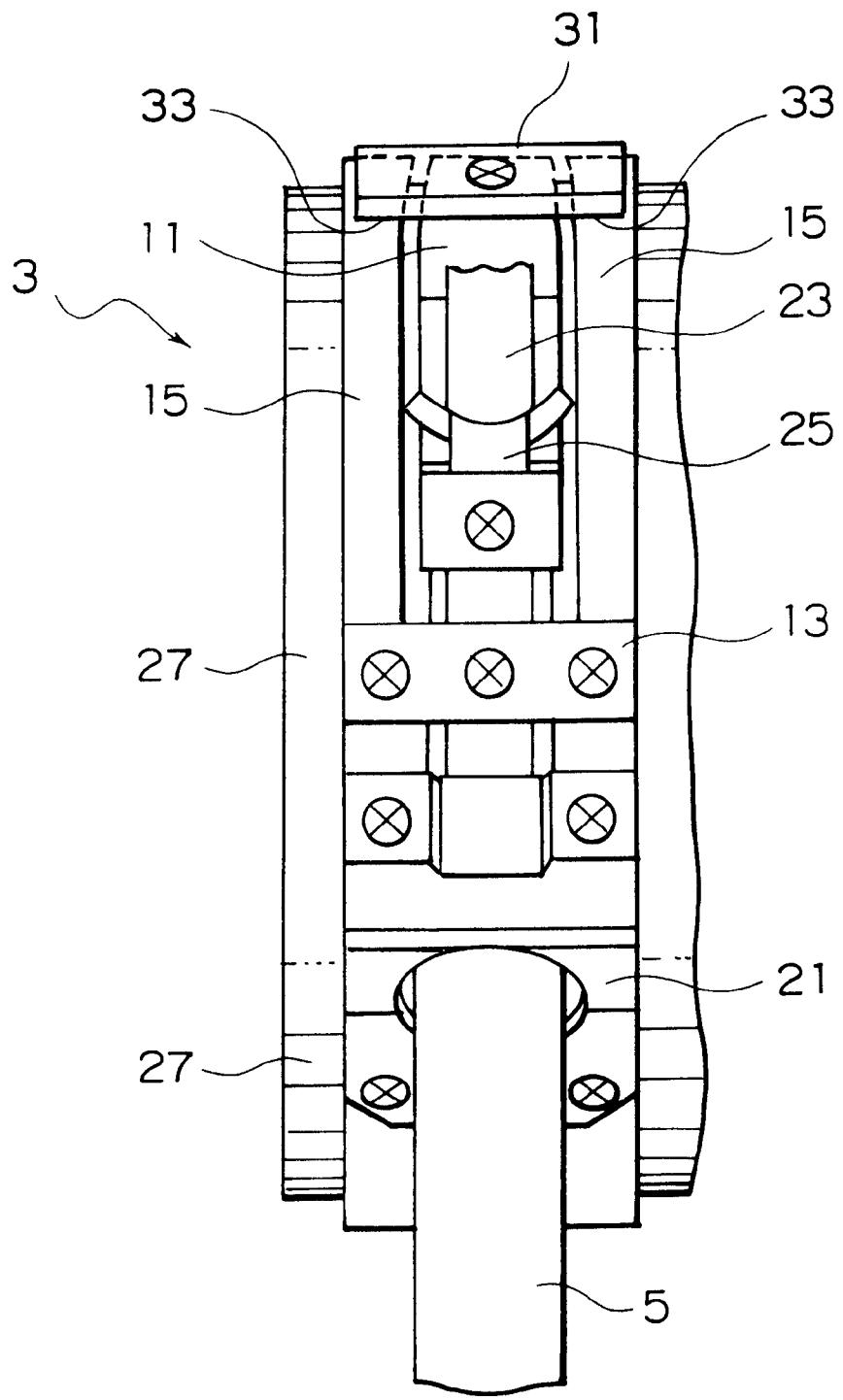
FIG. 2 is a view seen from the arrow A in FIG. 1.

FIG. 1 shows a double-wound band braking device according to a first embodiment of the present invention, seen from a side thereof, while FIG. 2 shows a view seen from the direction indicated by the arrow A in FIG. 1 (front view). As shown in these drawings, the double-wound band braking device of the present embodiment comprises a main body casing (transmission casing) 1, a double-wound brake band 3 set inside the main body casing 1, an anchor pin 5 for fixing the double-wound brake band 3 to the main body casing 1, and an actuator 7 for driving the double-wound brake band 3.

The double-wound brake band 3 is mainly constituted by an annular intermediate band 11, and a pair of annular outer bands 15 which are welded and jointed to the intermediate band 11 with the free ends thereof respectively facing the free end of the intermediate band 11 through a coupling plate 13. Friction members 17 and 19 are attached to the inner peripheral surfaces of the intermediate band 11 and the outer bands 15. Also, an anchor bracket 21 to be latched by an anchor pin 5 on the side of the main body casing 1 is attached to the operational end side of the outer bands 15. On the other hand, an applied bracket 25 for receiving the force in a direction in which the intermediate band 11 and the outer bands 15 are contracted from a push rod 23 of the actuator 7 is welded to the operational end side of the intermediate band 11. In this double-wound brake band 3, when the push rod 23 of the actuator 7 is operated in the direction indicated by the arrow in FIG. 1, the intermediate band 11 and the outer bands 15 are contracted, so as to put the brake on the drum 27 fitted in the double-wound brake band 3.

In case of the first embodiment, a guide plate 31 made of steel plate having the functions of both the deformation amount balancing means and the center misalignment correction means is welded and jointed to the intermediate band 11 at a position closer to the applied bracket 25. The guide plate 31 has guide portions 33 which are extended from the intermediate band 11 in the right and left directions in FIG. 2. The inner surfaces of these guide portions 33 are brought into sliding contact with the outer peripheral surfaces of the outer bands 15. Thereby, when the intermediate band 11 is set, or when it is contracted upon receiving a load from the actuator 7, only a contact pressure force between the guide portions 33 and the outer bands 15 becomes larger, and the intermediate band 11 is not protruded inward with respect to the outer bands 15. As a result, while having an appropriate gap with the drum 27 along the entire circumference thereof at the time of non-braking, the double-wound brake band 3 is contracted in a state close to a complete circle at the time of braking to apply the brake on the drum 27. In this respect, when the deformation amount balancing and the center misalignment correction can not be performed completely only by the guide plate 31, members having the functions of the deformation amount balancing means and the center misalignment correction means may be provided separately.

Figure 3:
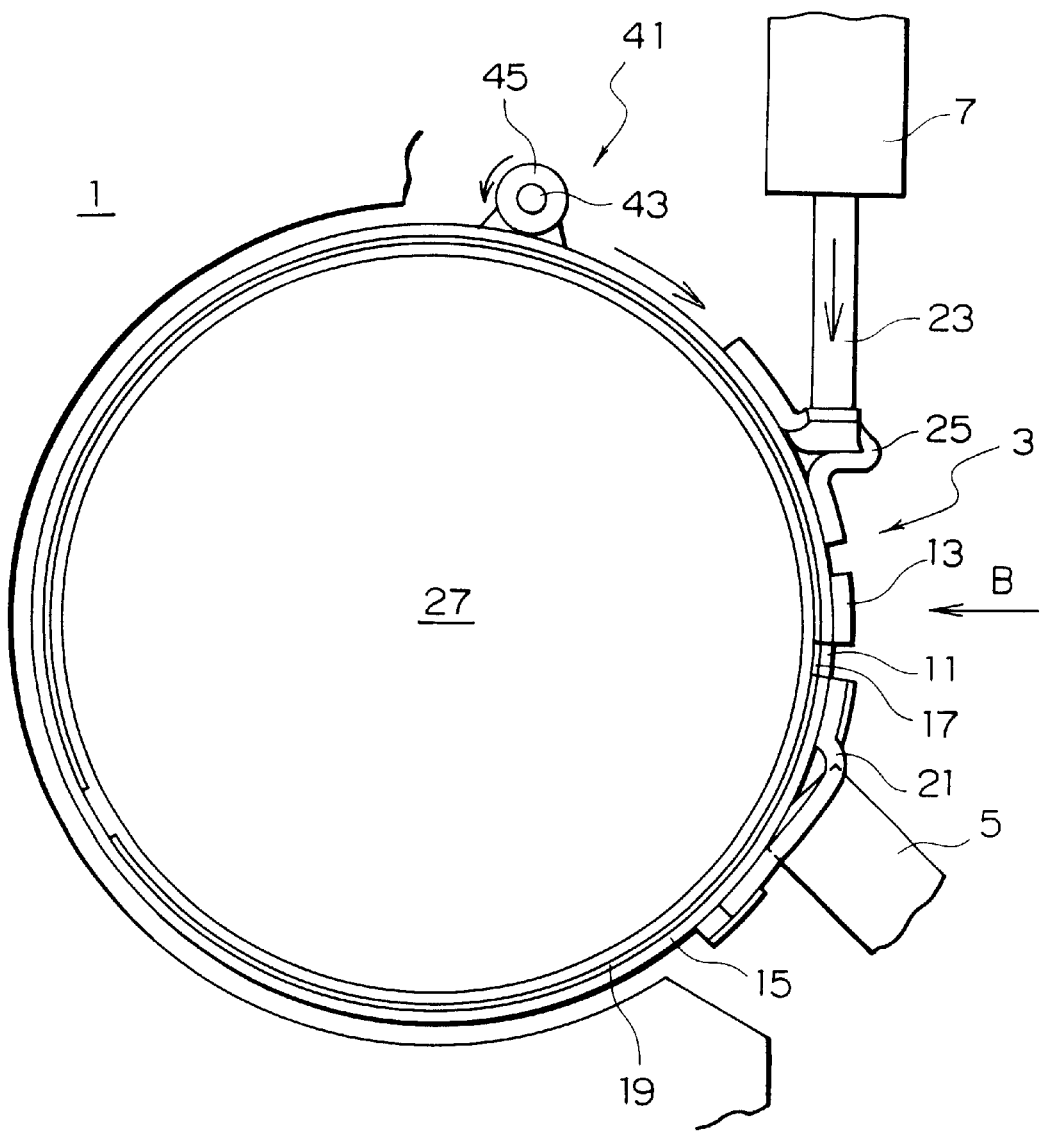
FIG. 3 is a side view for showing a double-wound band braking device according to a second embodiment of the present invention.
Figure 4:
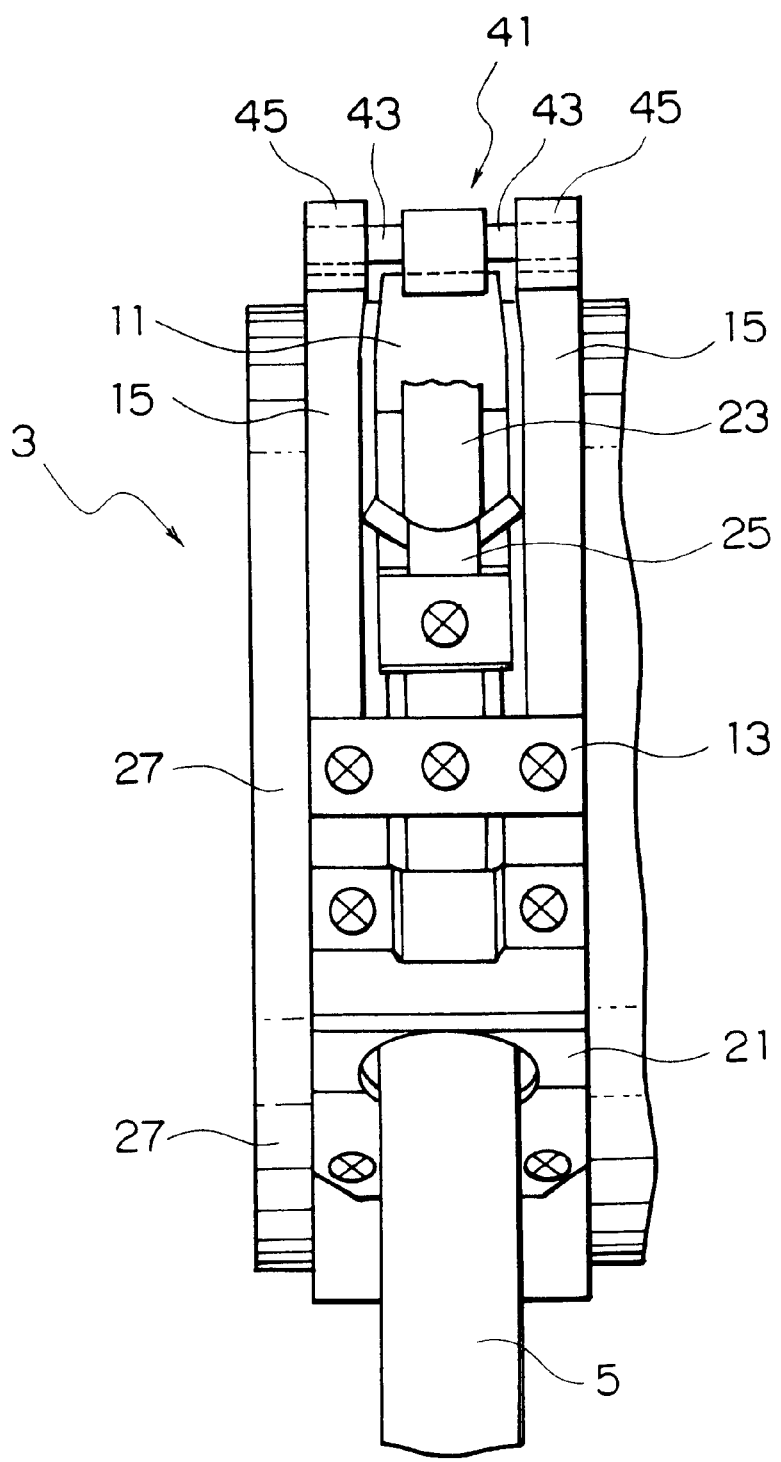
FIG. 4 is a view seen from the arrow B in FIG. 3.

FIG. 3 shows a double-wound band braking device according to a second embodiment of the present invention, seen from a side thereof, and FIG. 4 shows a view seen from the arrow B in FIG. 3 (front view). As shown in these drawings, the basic structure of the second embodiment is substantially the same as that of the first embodiment, so that the identical portions are given the same referential numerals and the description will be made only on different points. A roller guide 41 is welded and jointed to the intermediate band 11 in the second embodiment at a position closer to the applied bracket 25 to serve as an outer band protrusion preventing member. The roller guide 41 has a pair of pins 43 extended in the right and left directions in FIG. 4 from the intermediate band 11 and a roller 45 held by each pin 43 to be rotatable. The outer peripheral surface of the roller 45 is brought into contact with the outer peripheral surface of the outer band 15 in a rolling manner. The mode of operation in the second embodiment is also substantially the same as that in the first embodiment. However, since the rollers 45 are rolling at the time of braking, a resistance in contraction of the outer bands 15 becomes small, so that the device can be operated more smoothly, compared with that in the first embodiment.

Figure 5:
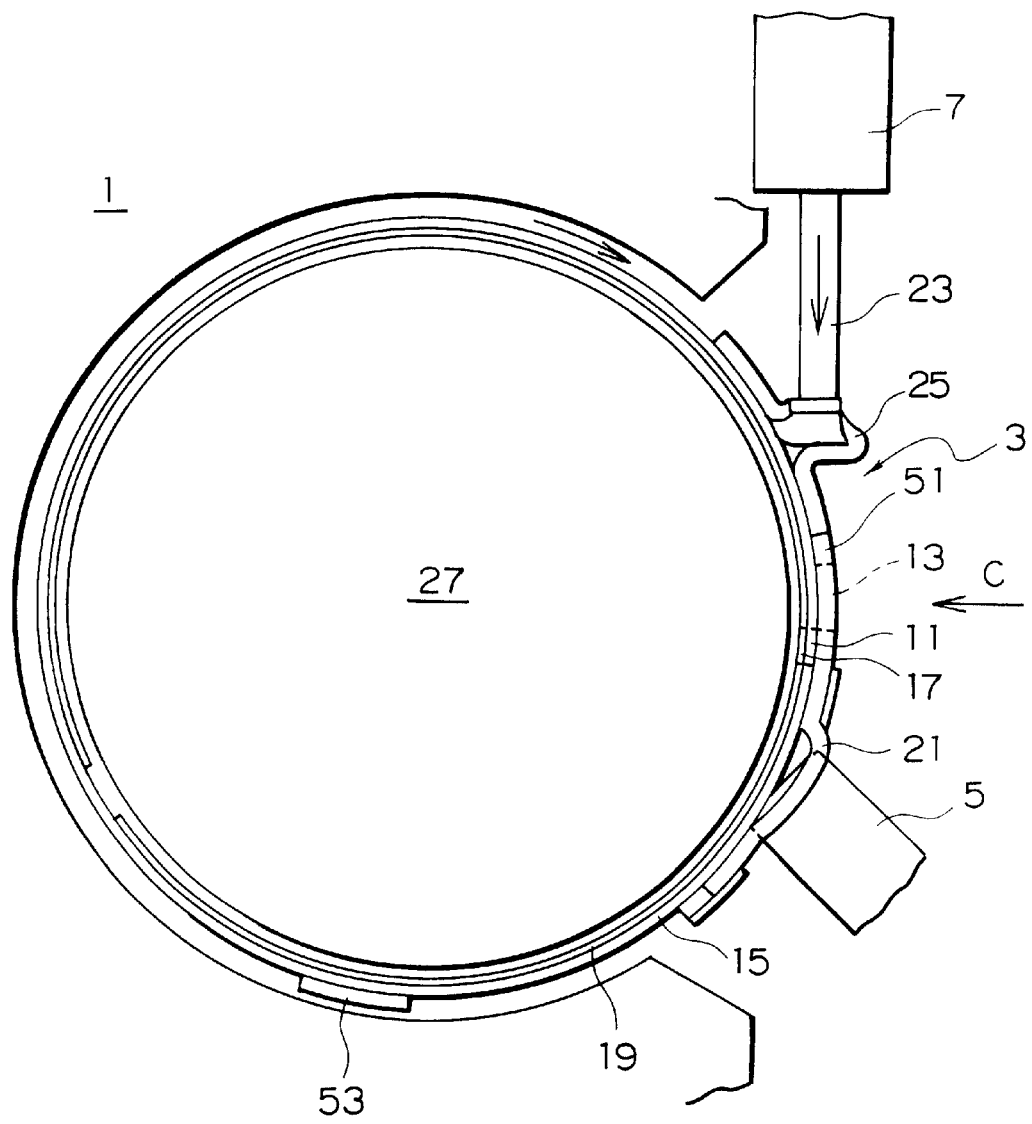
FIG. 5 is a side view for showing a double-wound band braking device according to a third embodiment of the present invention.
Figure 6:
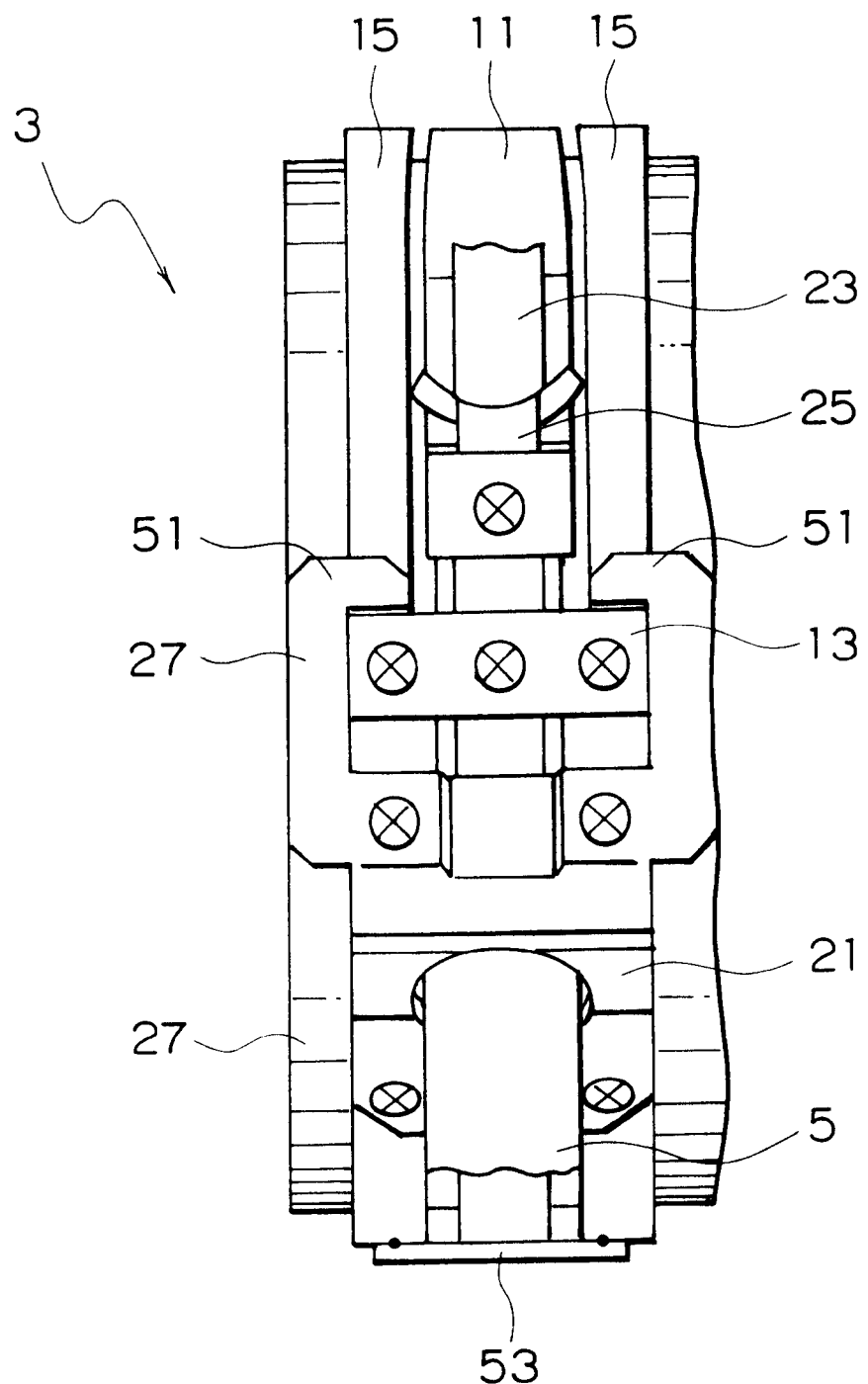
FIG. 6 is a view seen from the arrow C in FIG. 5.

FIG. 5 shows a double-wound band braking device according to a third embodiment of the present invention, seen from a side thereof, and FIG. 5 shows a view seen from the arrow C in FIG. 5 (front view). As shown in these drawings, the basic structure of the third embodiment is substantially the same as that of the first embodiment, so that the identical portions are given the same referential numerals and the description will be made only on different points. In the third embodiment, as shown in FIG. 6, a pair of right and left hooks 51 are integrally formed on the anchor bracket 21 to serve as the deformation amount balancing means, and the coupling plate 13 is latched by these hooks 51 in a state that the outer bands 15 are contracted by a predetermined amount. Also a guide plate 53 is welded and jointed to the outer bands 15, at a position closer to the anchor bracket 21, to serve as a positioning piece (center misalignment correction means).

In the third embodiment, since the outer bands 15 are contracted in advance in a state close to a set position, there is hardly generated a relative movement between the intermediate band 11 and the outer bands 15 at the time of setting, and also, the outward protrusion of the intermediate band 11 at the free end side portion is prevented by the guide plate 53. As a result, while having an appropriate gap with the drum 27 along the entire circumference thereof at the time of non-braking, the double-wound brake band 3 is contracted in a state close to a complete circle at the time of braking to apply the brake on the drum 27. In this respect, an amount m of the inward protrusion of the intermediate band 11 with respect to the outer bands 15 at the operational end side portion becomes extremely small, compared to that of the conventional device, and an amount n of the outward protrusion with respect to the outer bands 15 at the free end side portion becomes substantially zero.

Figure 7:
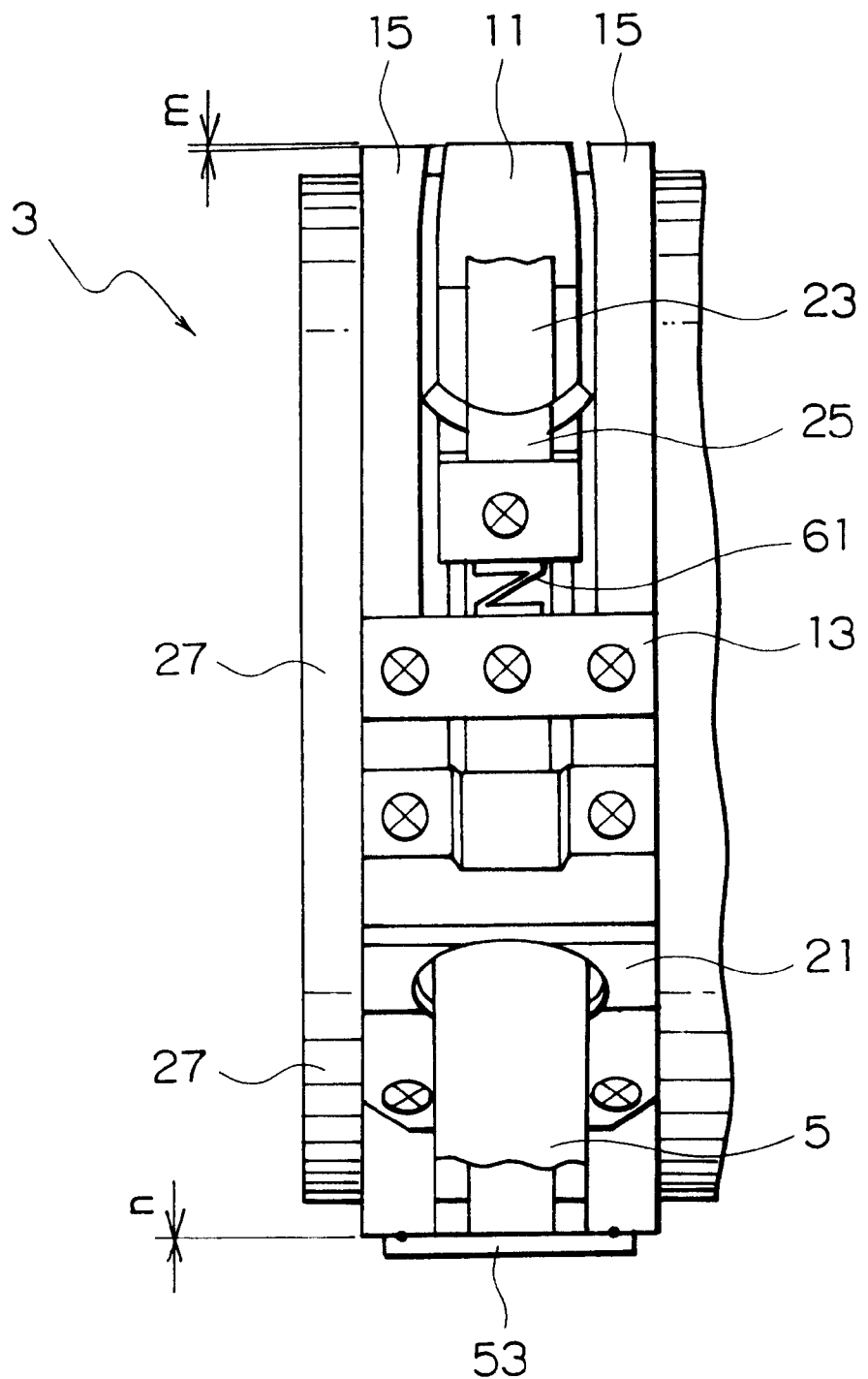
FIG. 7 is a front view for showing a double-wound band braking device according to a fourth embodiment of the present invention.

FIG. 7 shows a double-wound band braking device according to a fourth embodiment of the present invention, seen from the front side thereof. As shown in this drawing, the basic structure of the fourth embodiment is substantially the same as that of the first embodiment, so that the identical portions are given the same referential numerals and the description will be made only on different points. In the fourth embodiment, a spring 61 is interposed between the anchor bracket 21 and the coupling plate 13 to serve as the deformation amount balancing means. Also, like in the third embodiment, the guide plate 53 is welded and jointed to the outer bands 15, at a position closer to the anchor bracket 21, to serve as the positioning piece (center misalignment correction means).

Also in the fourth embodiment, like in the third embodiment, since the outer bands 15 are contracted in advance in a state close to a set position, there is hardly generated a relative movement between the intermediate band 11 and the outer bands 15 at the time of setting, and also, the outward protrusion of the intermediate band 11 at the free end side portion is prevented by the guide plate 53. As a result, while having an appropriate gap with the drum 27 along the entire circumference thereof at the time of non-braking, the double-wound brake band 3 is contracted in a state close to a complete circle at the time of braking to apply the brake on the drum 27.

Figure 8:
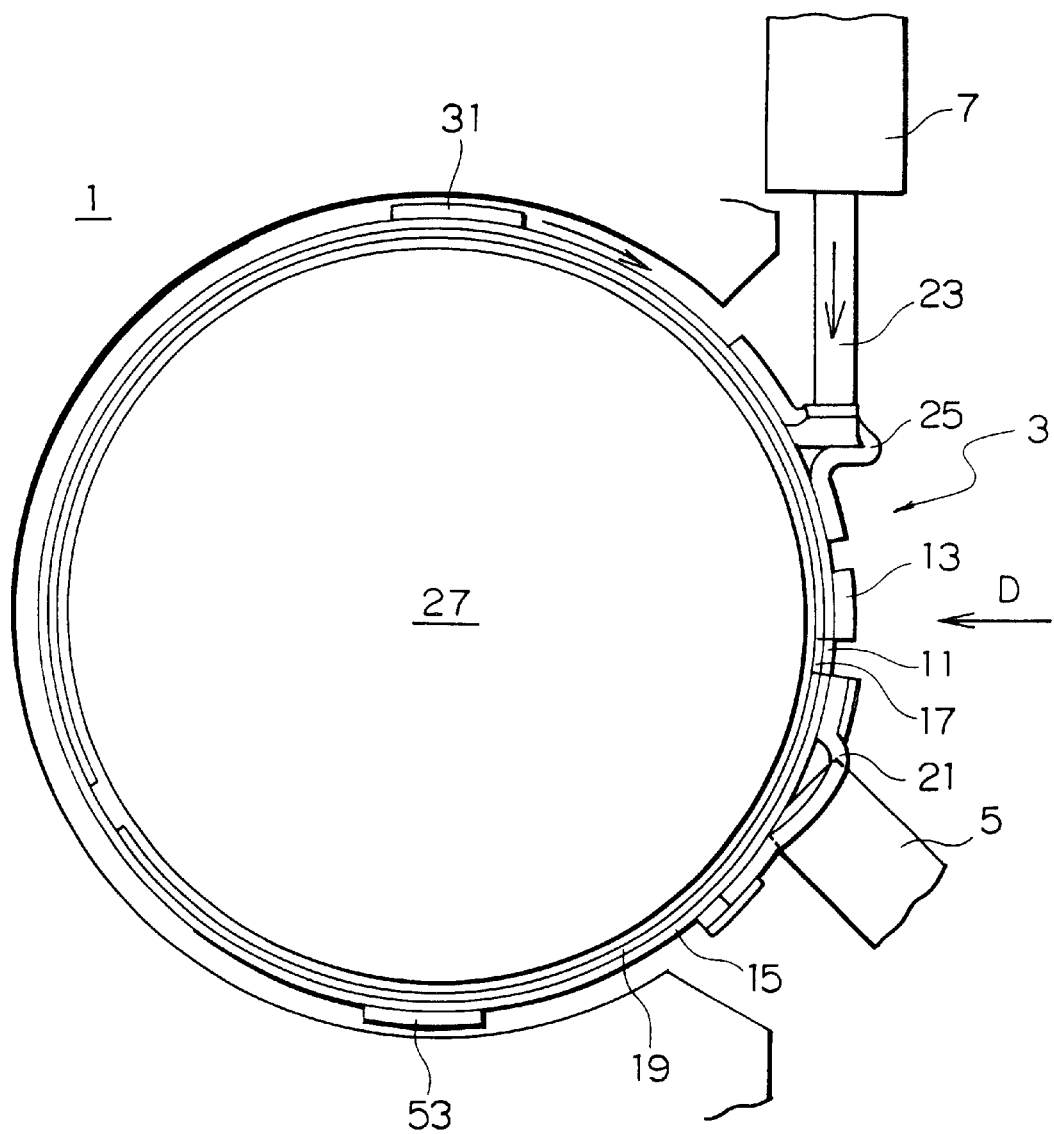
FIG. 8 is a side view for showing a double-wound band braking device according to a fifth embodiment of the present invention.
Figure 9:
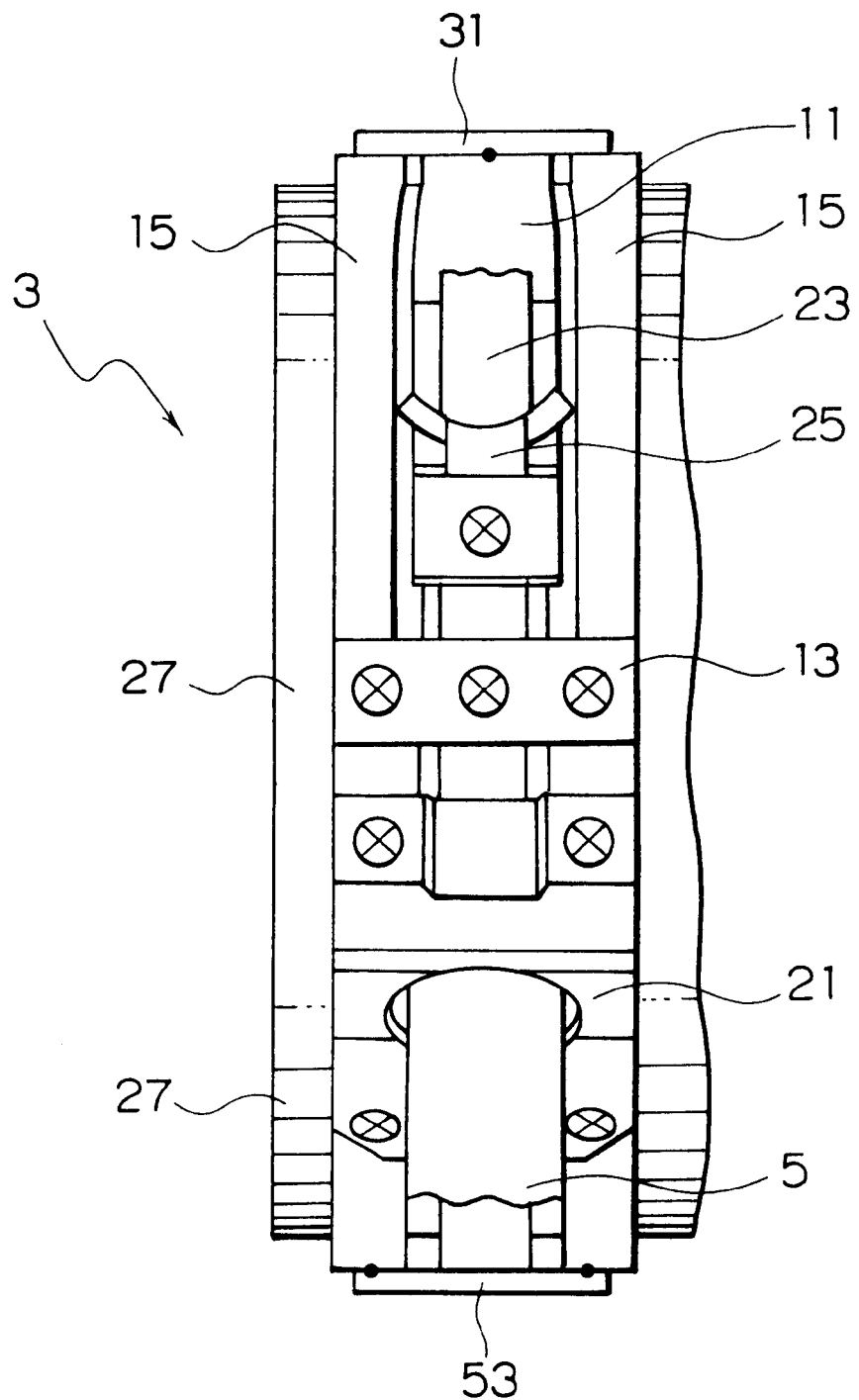
FIG. 9 is a view seen from the arrow D in FIG. 8.

FIG. 8 shows a double-wound band braking device according to a fifth embodiment of the present invention, seen from a side thereof, and FIG. 9 shows a view seen from the arrow D in FIG. 8 (front view). As shown in these drawings, the basic structure of the fifth embodiment is substantially the same as that of the first embodiment, so that the identical portions are given the same referential numerals and the description will be made only on different points. In the fifth embodiment, the guide plate 31 made of steel plate is welded and jointed to the intermediate band 11 at a position closer to the applied bracket 25 to serve as the outer band protrusion preventing member, while the guide plate 53 is welded and jointed to the outer bands 15 at a position closer to the anchor bracket 21 to serve as the positioning piece (center misalignment correction means), like in the third embodiment.

In the fifth embodiment, the double-wound brake band 3 is held at an exact position with respect to the drum 27 by means of the both guide plates 31 and 53. More specifically, since the intermediate band 11 and the outer bands 15 are detained by the both guide plates 31 and 53, an inclination due to the empty weight or an unintentional movement due to vibration can be prevented, and a relative movement between the intermediate band 11 and the outer bands 15 can be avoided. As a result, while having an appropriate gap with the drum 27 along the entire circumference thereof at the time of non-braking, the double-wound brake band 3 is contracted in a state close to a complete circle at the time of braking to apply the brake on the drum 27.

Figure 10:
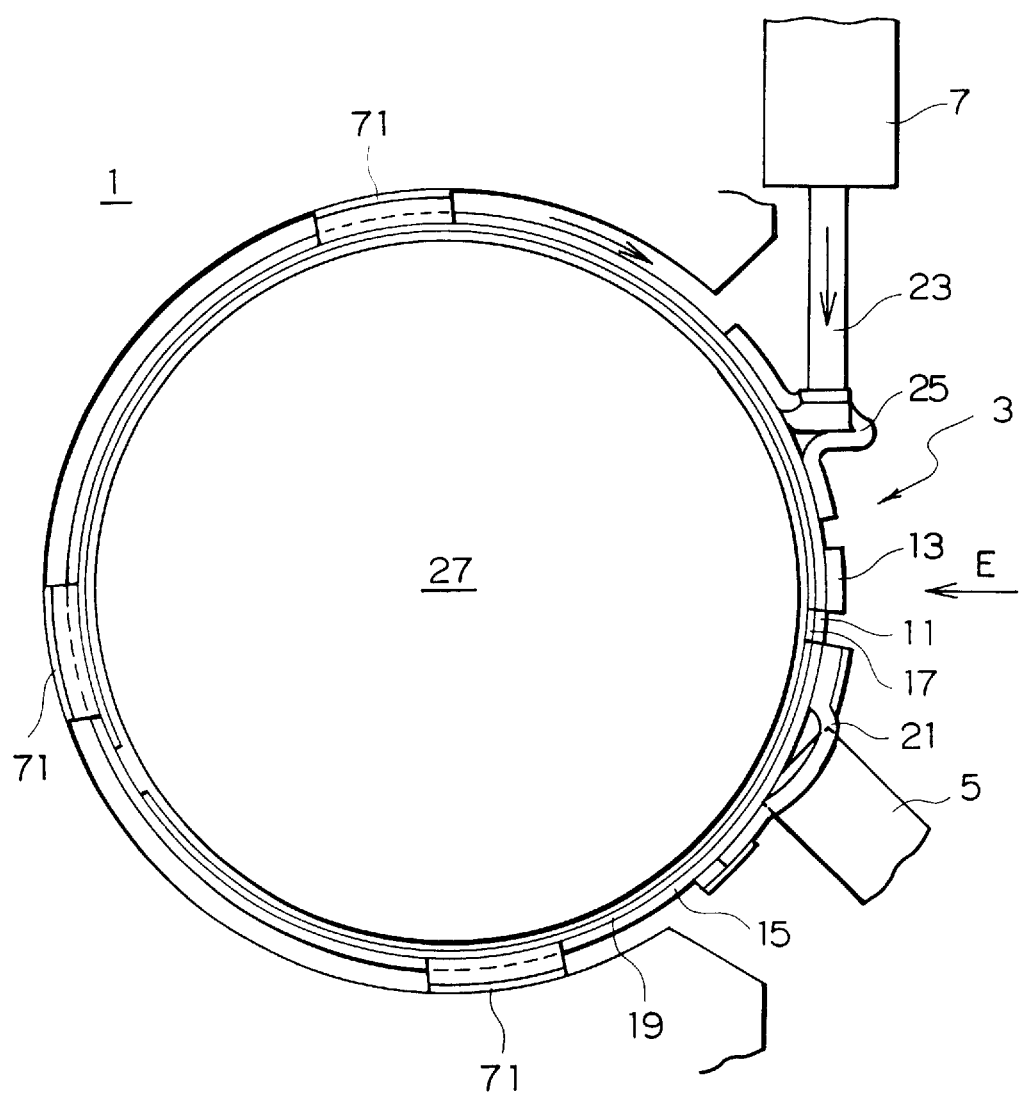
FIG. 10 is a side view for showing a double-wound band braking device according to a sixth embodiment of the present invention.
Figure 11:
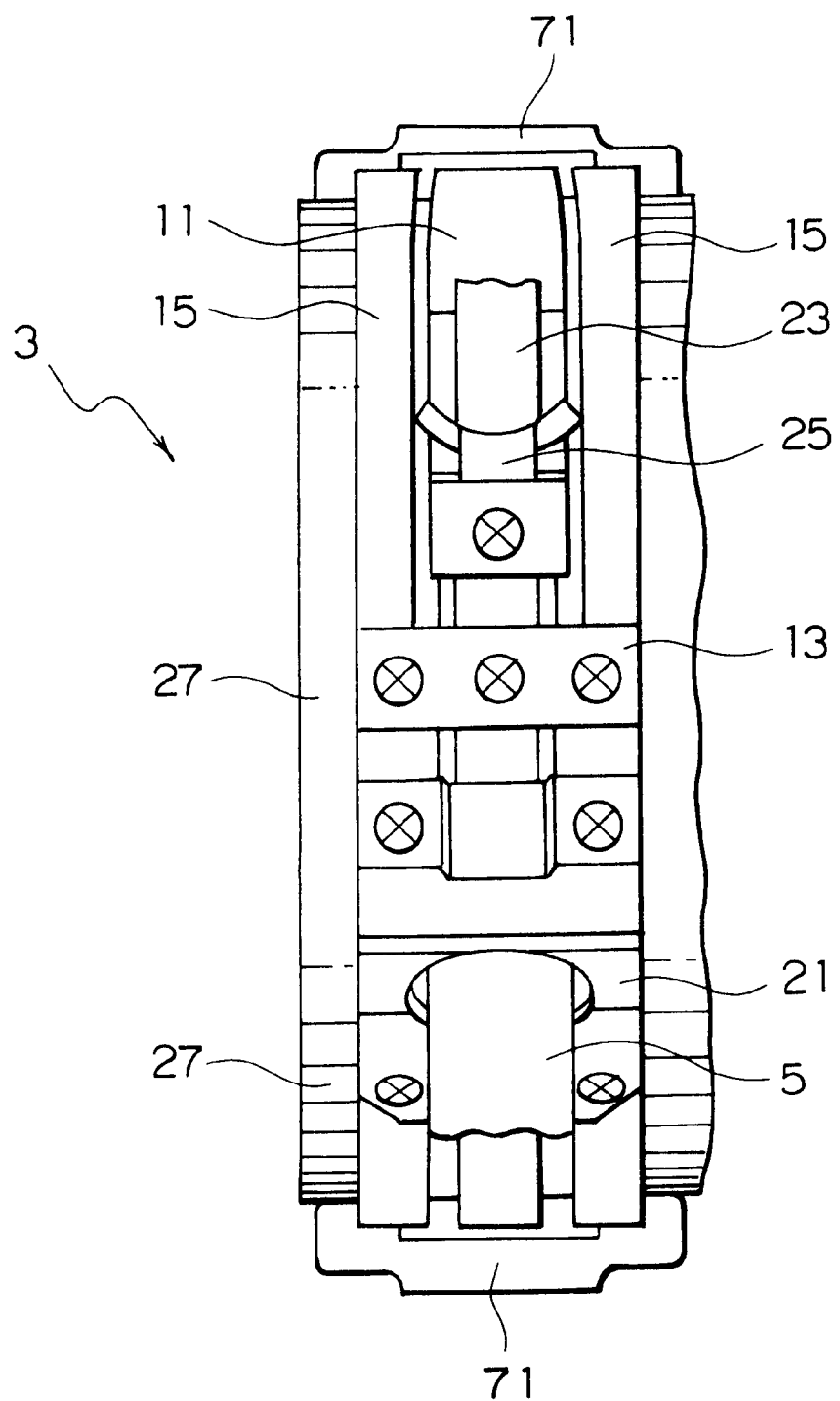
FIG. 11 is a view seen from the arrow E in FIG. 10.
Figure 12:
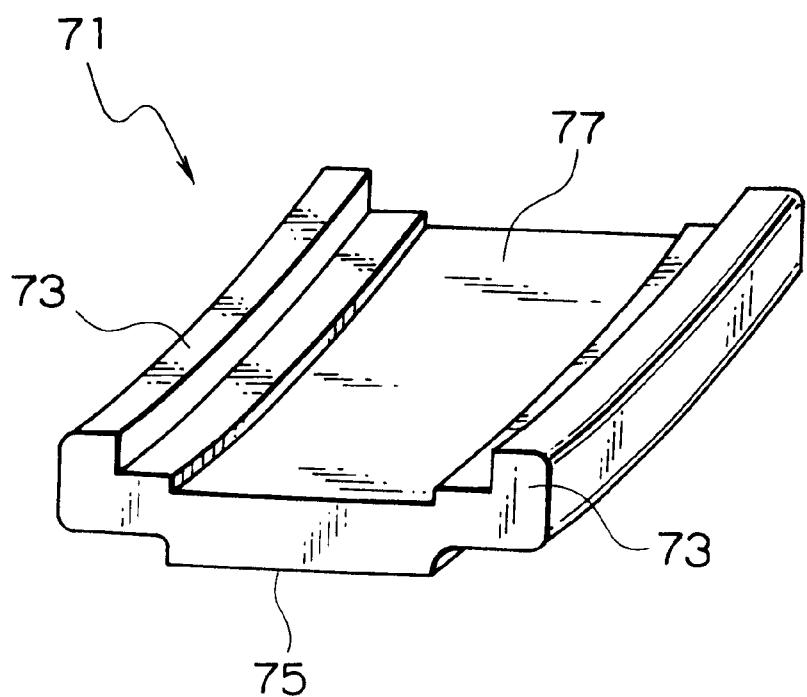
FIG. 12 is aperspective view of a positioning block.
Figure 13:
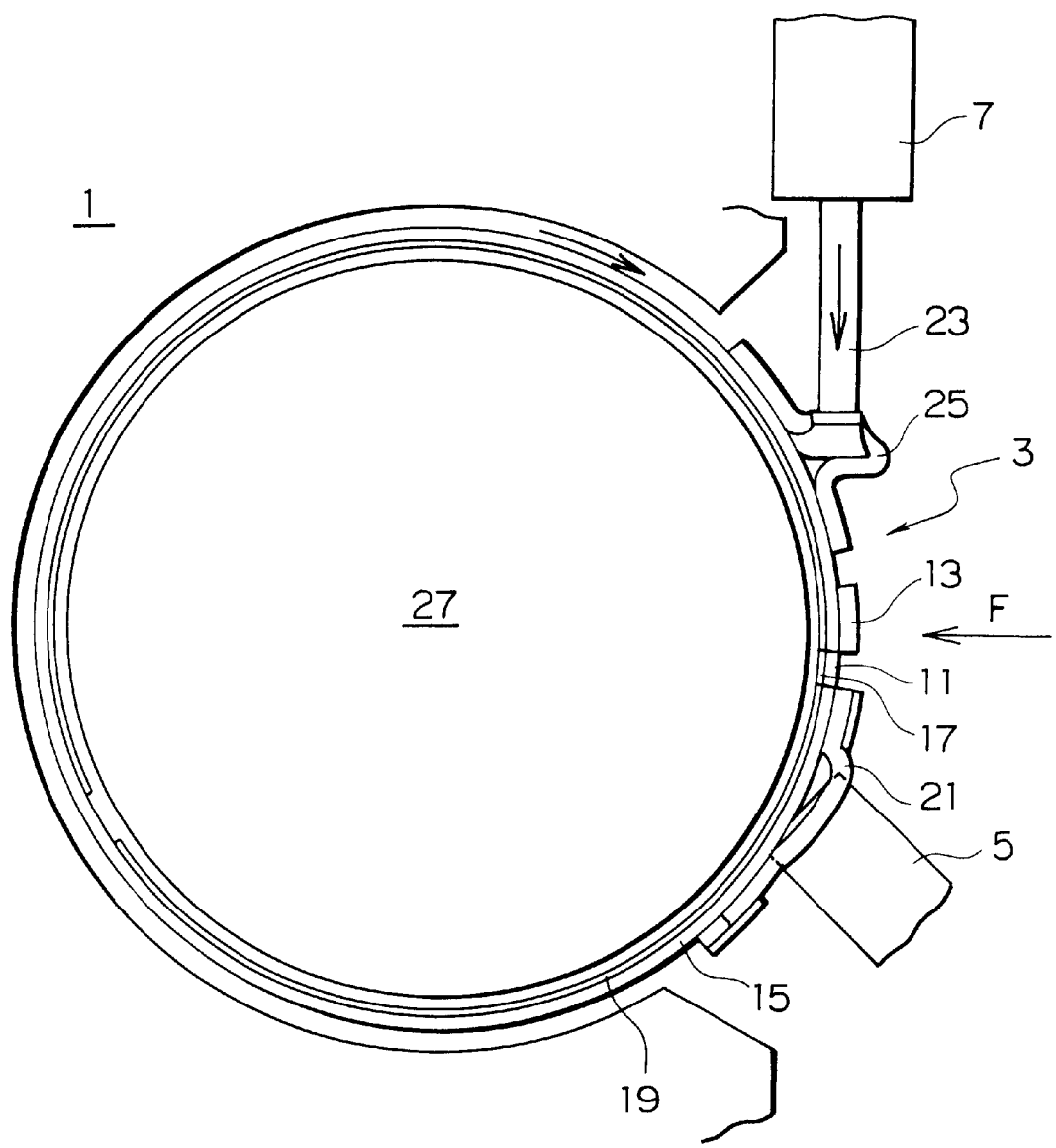
FIG. 13 is a side view for showing a double-wound band braking device according to the prior art.
Figure 14:
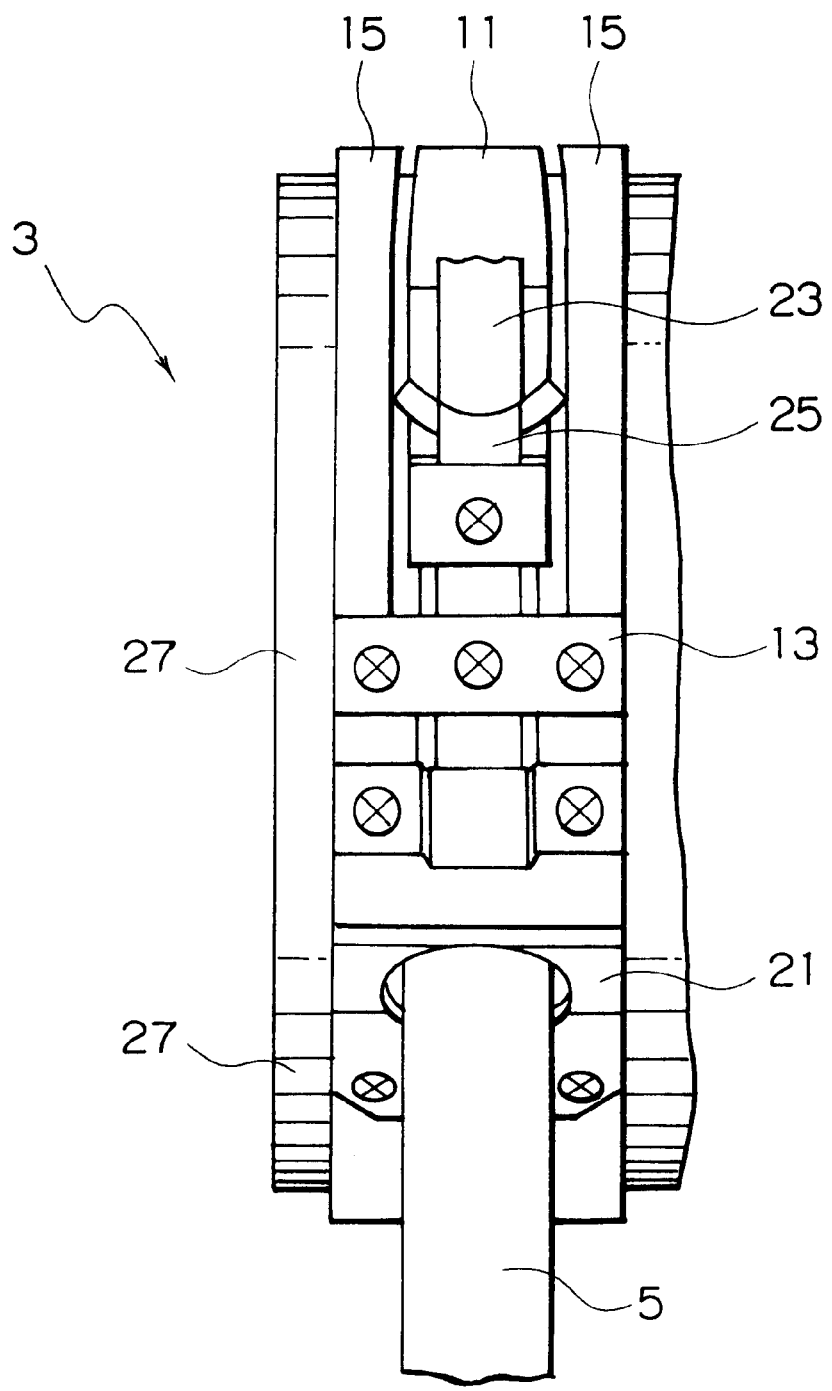
FIG. 14 is a view seen from the arrow F in FIG. 13.
Figure 15:
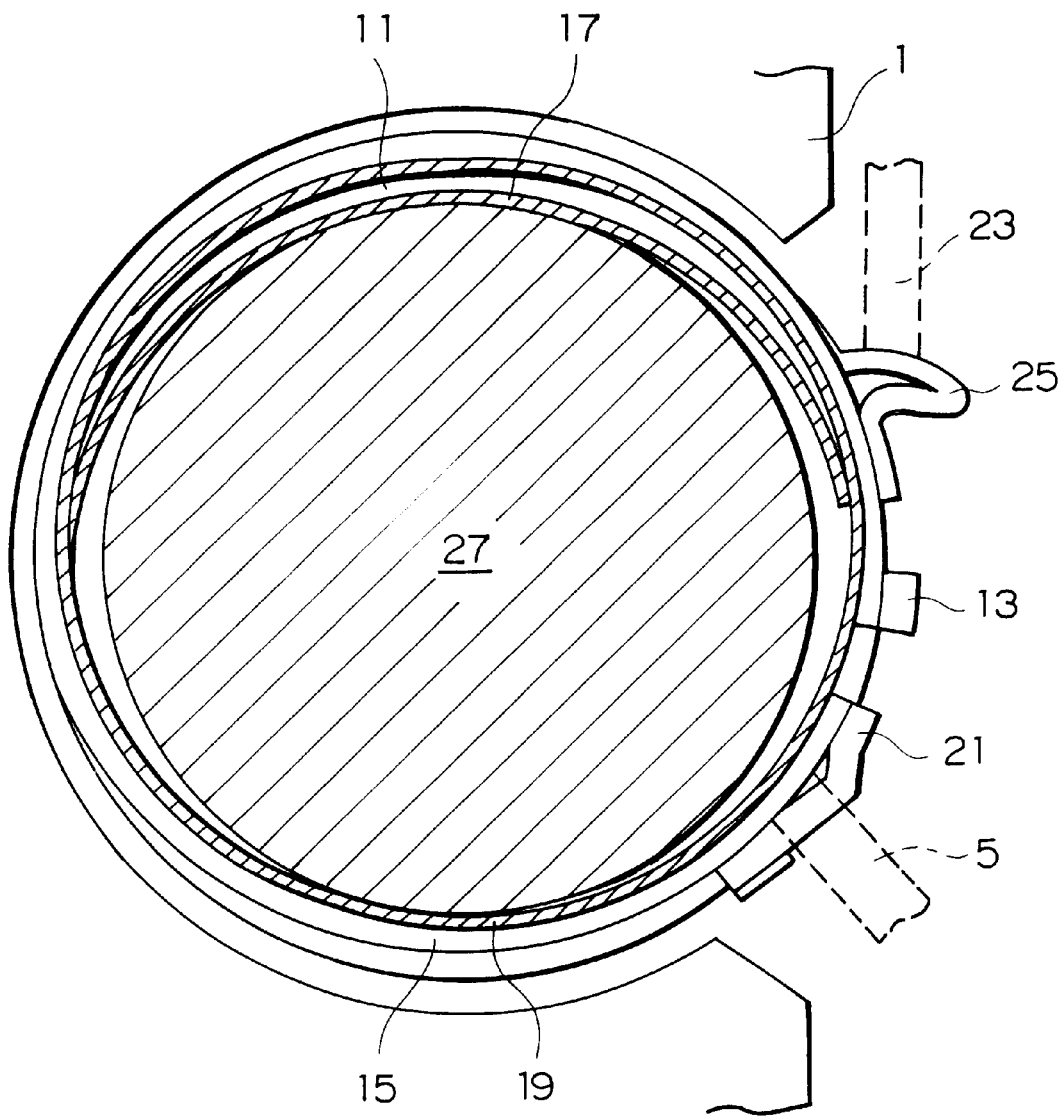
FIG. 15 is a side view for showing an operation of the double-wound band braking device according to the prior art.
Figure 16:
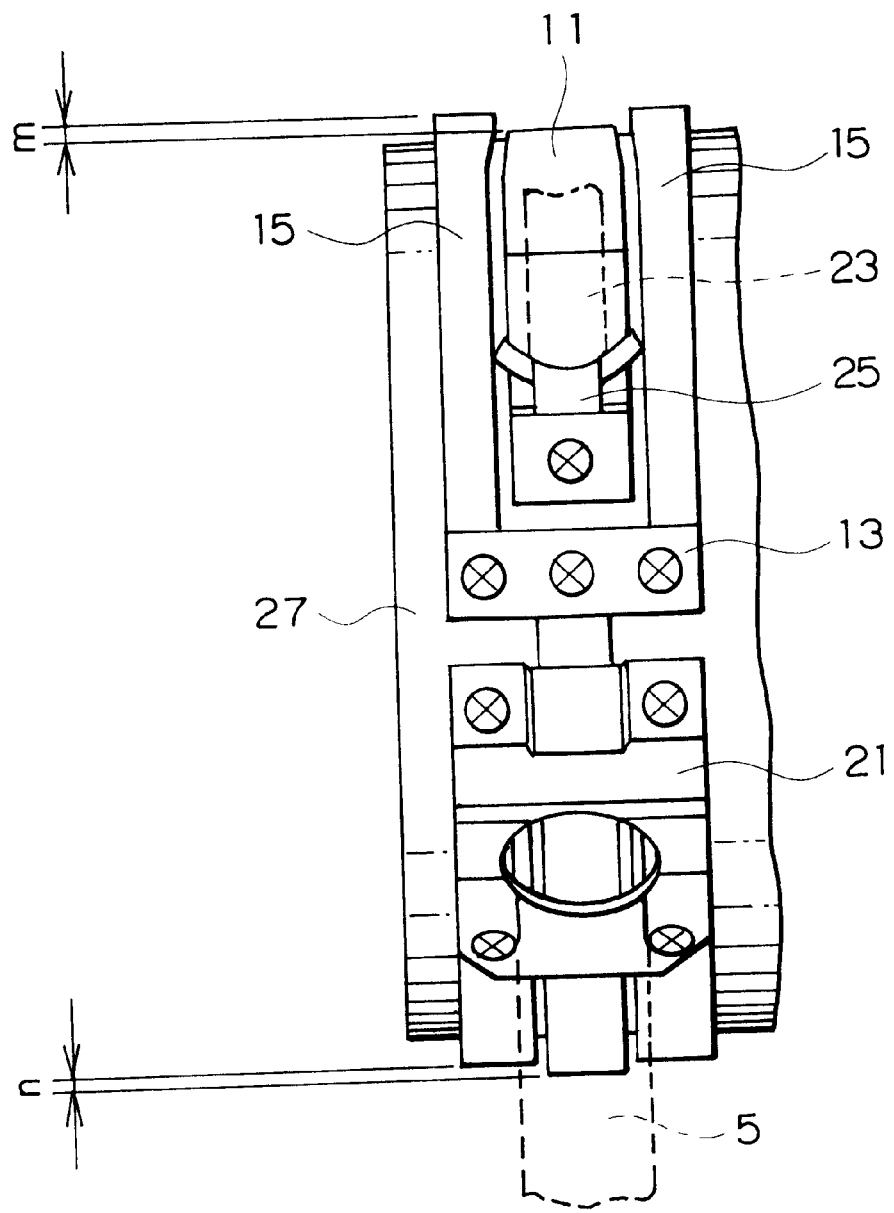
FIG. 16 is a side view for showing an operation of the double-wound band braking device according to the prior art.

FIG. 10 shows a double-wound band braking device according to a sixth embodiment of the present invention, seen from a side thereof, and FIG. 11 shows a view seen from the arrow E in FIG. 10 (front view). As shown in these drawings, the basic structure of the sixth embodiment is also substantially the same as that of the first embodiment, so that the identical portions are given the same referential numerals and the description will be made only on different points. In the sixth embodiment, three positioning blocks 71 are interposed between the main body casing 1 and the double-wound brake band 3 at equal intervals to serve as the deformation amount balancing means and the center misalignment correction means. The positioning blocks 71 are formed of synthetic resin by injection molding, and, as shown perspectively in FIG. 12, each of the positioning blocks is formed with ribs 73 which are to be brought into pressure contact and engagement with the outer bands 15 by elasticity, an outer peripheral portion 75 which is brought into contact with the inner peripheral surface of the main body casing 1 at the time of non-braking, and a groove 77 which allows the intermediate bands 11 to be protruded in a predetermined amount.

In the sixth embodiment, by the three positioning blocks 71, the relative movement of the centers of the intermediate band 11 and the outer bands 15 can be prevented without fail, and an inclination due to the empty weight or an unintentional movement due to vibration of the double-wound brake band 3 can be also prevented. As a result, while having an appropriate gap with the drum 27 along the entire circumference thereof at the time of non-braking, the double-wound brake band 3 is contracted in a state close to a complete circle at the time of braking so as to apply the brake on the drum 27. Moreover, since the positioning blocks 71 need not be welded, or the like, to be secured, it becomes easier to manufacture the double-wound brake band 3. In addition, since not receiving a torque or a biasing force at braking, the positioning blocks 71 do not fall off once set inside the main body casing 1.

The specific description of the embodiments of the present invention is as stated above. However, the present invention is not limited to those embodiments. In each of the foregoing embodiments, the present invention is applied to the double-wound band braking device which is, for example, incorporated in an automatic transmission of a car. However, the present invention may be applied to a double-wound band braking device used in an industrial machine, or the like. Moreover, in each of the foregoing embodiments, the guide plates or the roller guides are jointed to the intermediate band and the outer bands by welding. However, the guide plates and the roller guides maybe secured by adhesion, caulking, or brazing, or may be integrally formed with the intermediate band or the outer bands by pressing. Further, the specific structure of the double-wound band braking device including the specific structure, the form, or the like, of the deformation amount balancing means or the center misalignment correction means may be appropriately changed within the scope and sprit of the present invention.

The double-wound band braking device of the present invention is provided with a double-wound brake band which comprises the annular intermediate band with the friction surface formed on the inner peripheral side thereof, the pair of annular outer bands each with the free end secured to face the free end of the intermediate band and each with the friction surface formed on the inner peripheral side thereof, the anchor portion formed on the operational end side of either one of the intermediate band and the outer bands and is latched on the casing side of the main body, and the applied portion formed on the operational end side of the other of the intermediate band and the outer bands, for receiving the force in the direction in which the intermediate band and the outer bands are contracted, from the actuator. The double-wound band braking device is used in braking the rotary member fitted in the double-wound brake band, comprising either one of the deformation amount balancing means for balancing an amount of the elastic deformation of the intermediate band and an amount of the elastic deformation of the outer bands at a predetermined position, and the center misalignment correction means for correcting the center misalignment between the intermediate band and the outer bands. Thus, while having an appropriate gap with the rotary member along the entire circumference thereof at the non-braking time, the double-wound brake band is contracted in a state close to a complete circle at the time of braking to apply the brake on the drum, so that a power loss or deterioration of the friction members caused by an unnecessary sliding contact between the friction members and the rotary member can be avoided.

What is claimed is:

1. A double-wound band braking device for use in braking a rotary member, comprising:

an annular intermediate band with a friction surface formed on an inner peripheral side thereof;

a pair of annular outer bands each with a free end secured to face a free end of said intermediate band and each with a friction surface formed on an inner peripheral side thereof;

an anchor portion formed at an operational end side of at least one of said intermediate band and said outer bands, and to be latched to a casing side of a main body; and an applied portion formed at said operational end side of the other of said intermediate band and said outer bands, and adapted to receive a force in a direction in which said intermediate band and said outer bands are contracted; and deformation amount balancing means for balancing an amount of elastic deformation of said intermediate band and an amount of elastic deformation of said outer bands, wherein said deformation amount balancing means includes a hook secured to said anchor portion and that latches said outer bands such that said outer bands are contracted by a predetermined amount.

2. A double-wound band braking device according to claim 1, further comprising center misalignment correction means for correcting a center misalignment between said intermediate band and said outer bands, wherein said center misalignment correction means includes a positioning piece which is secured to outer peripheral surfaces of said paired outer bands in such a manner that it is approximated to or brought into sliding contact with an outer peripheral surface of said intermediate band so as to prevent a relative protrusion of said intermediate band.

3. A double-wound braking device according to claim 1, wherein said anchor portion is formed at said operational end side of said outer bands.

4. A braking device, comprising:

an annular intermediate band with a free end side and an operational end side and having a friction surface on an inner peripheral side thereof;

annular outer bands having a free end side and an operational end aide and each having a friction surface on an inner peripheral side thereof;

a coupling member having the free end sides of the intermediate band and the outer bands secured thereto;

an anchor portion secured to the operational end side of one of the intermediate band and the outer bands, and to be latched to a casing aide of a main body;

an apply portion secured to the operational end side of the other of the intermediate band and the outer bands, and adapted to receive a force in a direction in which the intermediate band and the outer bands are contracted; and a hook secured to the anchor portion and adapted to latch the free end side of said one of the intermediate band and the outer bands such that said one of the intermediate band and the outer bands is pre-contracted.

5. A braking device according to claim 4, further comprising a guide member having a positioning portion secured to outer peripheral surfaces of the outer bands such that the guide member is in sliding contact with an outer peripheral surface of the intermediate band so as to prevent a relative protrusion of said intermediate band.

6. A braking device according to claim 4, wherein the anchor portion is secured to the operational end side of the outer bands.

* * * * *